United States Patent
Harvey et al.

[19]

[11] Patent Number: 5,975,561
[45] Date of Patent: Nov. 2, 1999

[54] STEERING SHAFT ATTACHMENT

[75] Inventors: Jeffrey A. Harvey, Sterling Heights; James C. Dunn, Port Huron, both of Mich.

[73] Assignee: TRW Inc., Lyndhurst, Ohio

[21] Appl. No.: 09/206,060

[22] Filed: Dec. 4, 1998

[51] Int. Cl.⁶ .............................. B60R 21/16; F16B 19/02
[52] U.S. Cl. .................. 280/728.2; 280/731; 411/354
[58] Field of Search ................... 280/775, 728.2, 280/731, 779; 403/96, 83, 161; 411/354, 393

[56] References Cited

U.S. PATENT DOCUMENTS

| | | | |
|---|---|---|---|
| 3,047,318 | 7/1962 | Berkshire | 287/52.08 |
| 5,344,252 | 9/1994 | Kakimoto | 403/358 |
| 5,615,910 | 4/1997 | Margetak et al. | 280/731 |
| 5,685,559 | 11/1997 | Cuevas | 280/728.2 |

FOREIGN PATENT DOCUMENTS

WO 95/09756  4/1995  Sweden .

*Primary Examiner*—Lanna Mai
*Assistant Examiner*—Christopher Bottorff
*Attorney, Agent, or Firm*—Tarolli, Sundheim, Covell, Tummino & Szabo

[57] ABSTRACT

A rotatable steering shaft (12) has a surface (93) that defines a tapered locking opening (92). A mounting member (14) receivable on the shaft (12) has a first locking pin passage (70). A locking pin (16) for securing the mounting member (14) to the shaft (12) has a first portion (100) receivable in the first locking pin passage (70) in the mounting member (14). The locking pin (16) also has a tapered end portion (104) receivable in the tapered locking opening (92) in the shaft to secure the mounting member to the shaft for rotation with the shaft.

10 Claims, 2 Drawing Sheets

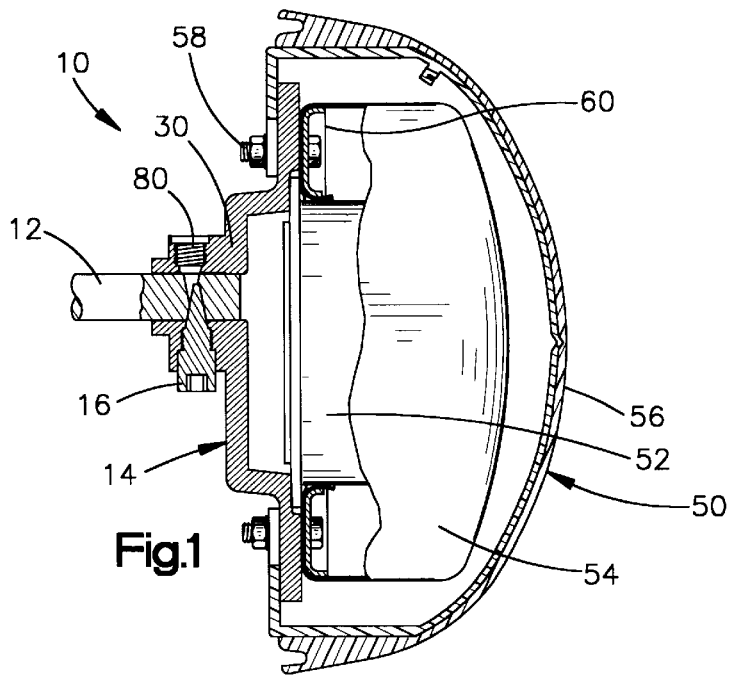
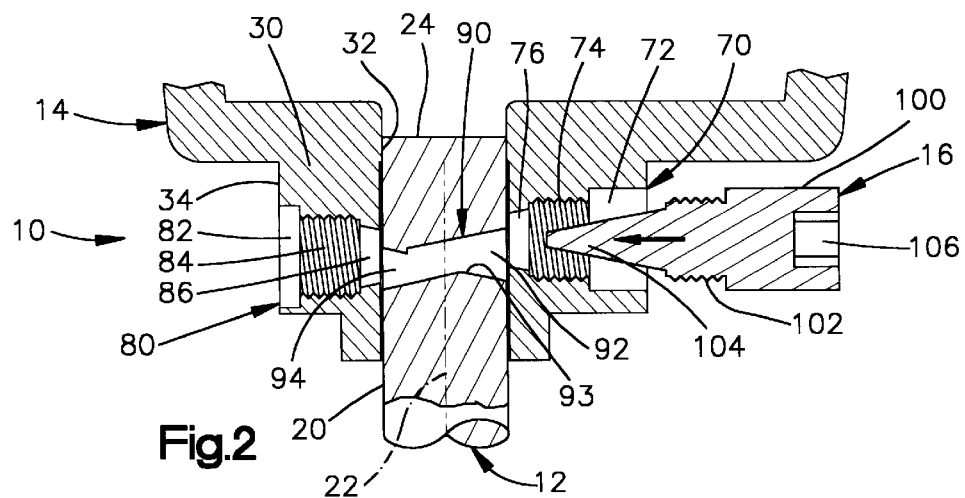
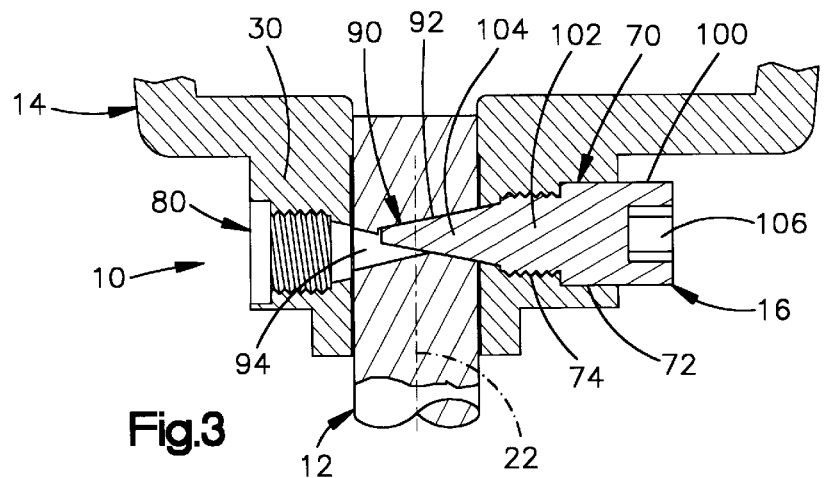

STEERING SHAFT ATTACHMENT

BACKGROUND OF THE INVENTION

1. Technical Field

The present invention relates to the attachment of a vehicle steering wheel and/or a vehicle occupant safety apparatus to the steering input shaft of a vehicle.

2. Description of the Prior Art

U.S. Pat. No. 5,615,910, entitled Apparatus for Restraining a Driver of a Vehicle, illustrates a mounting member for supporting a steering wheel and a driver's side air bag module on a vehicle steering input shaft. The mounting member has a neck which receives an end portion of the steering shaft. A set screw is supported in a radially extending bore in the neck of the mounting member. The set screw engages the end portion of the steering shaft to hold the mounting member on the steering shaft. The engagement of the set screw with the steering shaft provides only point contact between the two parts.

SUMMARY OF THE INVENTION

The present invention is an apparatus comprising a rotatable steering shaft having a surface that defines a tapered locking opening. A mounting member receivable on the shaft has a first locking pin passage. A locking pin for securing the mounting member to the input shaft has a first portion receivable in the first locking pin passage in the mounting member. The locking pin also has a tapered end portion receivable in the tapered locking opening in the shaft to secure the mounting member to the shaft for rotation with the shaft.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 1 is a side view, partly in section, of an apparatus in accordance with the present invention, shown in an assembled condition;

FIG. 2 is an enlarged view of a portion of the apparatus of FIG. 1, shown in a partially assembled condition;

FIG. 3 is an enlarged view similar to FIG. 2 showing the apparatus in an assembled condition;

DESCRIPTION OF A PREFERRED EMBODIMENT

Figure 4:
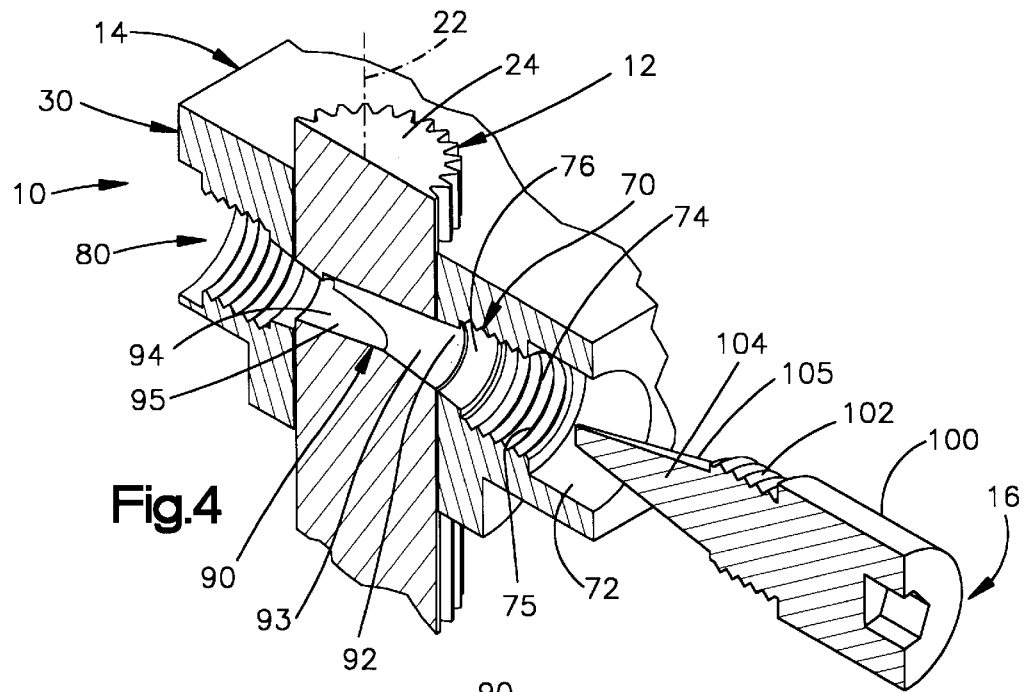
FIG. 4 is an exploded perspective view of the parts of FIG. 3.

The present invention relates to the attachment of a vehicle steering wheel and/or a vehicle safety apparatus to the steering input shaft of a vehicle. As representative of the present invention, FIG. 1 illustrates an apparatus 10 including a vehicle steering input shaft 12, a mounting member 14, and a pin 16.

The input shaft 12 is a part of a steering column of a vehicle. The shaft 12 has a cylindrical outer side surface 20 (FIG. 2) centered on an axis 22. The shaft 12 also has a flat, radially extending end surface 24. The shaft 12 is fixed axially in the vehicle but is supported for rotation about the axis 22.

The mounting member 14 includes a hub 30. The hub 30 has a cylindrical inner side surface 32 centered on the steering axis 22. The hub 30 also has an outer side surface 34. The inner side surface 32 of the hub 30 and the outer surface 20 of the shaft 12 may, if desired, be splined as shown and may also be tapered. When the hub 30 is mounted on the shaft 12 as described below, the mounting member 14 is rotatable with the shaft.

The mounting member 14 supports a vehicle occupant safety apparatus 50, which in the illustrated embodiment is a driver's side air bag module. The module 50 includes an inflator 52 and a particular type of inflatable vehicle occupant protection device 54 which is known as an air bag. The inflator 52 may contain an ignitable material for generating a large volume of inflation fluid. The inflator 52 may alternatively contain a stored quantity of pressurized inflation fluid, or a combination of pressurized inflation fluid and ignitable material for heating the inflation fluid. The inflator 52 and the air bag 54 are enclosed in a cover 56.

A plurality of fasteners 58 and a retaining ring 60 secure the inflator 52, the air bag 54 and the cover 56 to the mounting member 14. The mounting member 14 also supports a vehicle steering wheel (not shown) through fasteners (not shown) connected with the mounting member.

The hub 30 has a first locking pin passage 70 which extends radially between the inner and outer surfaces 32 and 34 of the hub. A radially outermost portion 72 of the first pin passage 70 has a cylindrical configuration. An intermediate portion 74 of the first pin passage 70 is defined by a threaded surface 75 (FIG. 4) on the hub 30. A radially inner portion 76 of the first pin passage 70 tapers from its radially outer end to its radially inner and (at the inner surface 32 of the hub 30).

The hub 30 also has a second locking pin passage 80, diametrically opposite the first pin passage 70. The second locking pin passage 80 is axially offset from the first locking pin passage 70. Specifically, the second pin passage 80 is located farther from the end surface 24 of the shaft 12 than is the first pin passage 70.

The configuration of the second pin passage 80 is generally similar to the configuration of the first pin passage 70. The second pin passage 80 has a cylindrical radially outer portion 82, a threaded intermediate portion 84, and a tapered inner portion 86. The inner portion 86 of the second pin passage 80 tapers radially inward at the same angle as the inner portion 76 of the first pin passage 70.

The shaft 12 has a through hole or locking opening 90 which extends generally diametrically through the shaft. The locking opening 90 has a first portion 92 and a second portion 94. The first portion 92 of the locking opening 90 is defined by a right conical surface 93 centered on a radius of the shaft 12. The first portion 92 of the locking opening 90 extends radially inward from one side of the shaft 12 and is tapered at the same angle of taper as the inner portion 76 of the first pin passage 70 in the hub 30.

The first portion 92 of the locking opening 90 preferably extends for more than half of the width (diameter) of the shaft 12. In the illustrated embodiment, the first portion 92 of the locking opening 90 extends for approximately 80% of the width of the shaft 12. The diameter of the first portion 92 of the locking opening 90, at the outer side surface 20 of the shaft 12, is the same as the diameter of the tapered inner portion 76 of the first pin passage 70 at its radially inner end, that is, at the inner surface 32 of the hub 30.

The second portion 94 of the locking opening 90, defined by a right conical surface 95 (FIG. 4), extends radially inward from the outer side surface 20 of the shaft 12 at a location diametrically offset from the first portion 92. The second portion 94 of the locking opening 90 is tapered at the same angle of taper as the first portion 92.

The second portion 94 of the locking opening 90 is axially offset from the first portion 92 of the locking opening. Specifically, the second portion 94 of the locking opening 90 is located farther from the end surface 24 of the shaft 20 than is the first portion 92. The second portion 94 of the locking opening 90 intersects the first portion 92 of the locking opening.

The pin 16 (FIGS. 2 and 4) has a cylindrical head portion 100. The head portion 100 of the pin 16 is substantially the same length as the outer portion 72 of the first pin passage 70. A drive socket 106 is formed in the head portion 100 of the pin 16. An externally threaded shank portion 102 of the pin 16 is engageable with the threaded surface 75 defining the intermediate portion 74 of the first pin passage 70.

A tapered end portion 104 of the pin 16 has a right conical outer surface 105. The end portion 104 of the pin 16 is slightly shorter than the first portion 92 of the locking opening 90. The end portion 104 of the pin 16 is tapered at the same angle of taper as the inner portion 76 of the first pin passage 70 and as the first portion 92 of the locking opening 90 in the shaft 12. Thus, the end portion 104 of the pin 16 is configured to seat tightly within the hub 30 and the shaft 12.

To fix the mounting member 14 to the shaft 12, the first pin passage 70 in the hub 30 is aligned circumferentially with the first portion 92 of the locking opening 90 in the shaft 12 by a suitable keying arrangement (not shown). The hub 30 is moved axially onto the shaft 12. The inner diameter of the hub 30 and the outer diameter of the shaft 12 are selected so that the hub does not initially move into its final assembled position (FIG. 3) on the shaft but instead stops in an intermediate position of assembly (FIG. 2). In this intermediate position of assembly, the first pin passage 70 in the hub 30 is slightly offset axially from the first portion 92 of the locking opening 90 in the shaft 12.

The locking pin 16 is then moved into the first pin passage 70 in the hub 30. The tapered end portion 104 of the pin 16 passes completely through the first pin passage 70 and into the first portion 92 of the locking opening 90 in the shaft 12. The threaded shank portion 102 of the pin 16 is screwed into the intermediate portion 74 of the first pin passage 70. The head portion 100 of the pin 16 is received in the cylindrical outer portion 72 of the first pin passage 70.

As the pin 16 is threaded into the hub 30, the tapered end portion 104 of the pin engages the conical surface 93 defining the first portion 92 of the locking opening 90 in the shaft 12. This engagement between the pin 16 and the shaft 12 is point contact only, because of the initial axial offset between the hub 16 and the shaft 12. Further movement of the pin 16 into the locking opening 90 results in an axially directed force being applied between the pin and the shaft. Because the shaft 12 is fixed axially in the vehicle, this force causes the hub 30, and the mounting member 14 as a whole, to move in a downward direction as viewed in FIG. 2, farther onto the shaft.

As the pin 16 is screwed farther into the hub 30, the mounting member 14 eventually moves to a position as shown in FIG. 3 in which the first pin passage 70 in the hub is aligned axially with the first portion 92 of the locking opening 90 in the shaft 12. The tapered end portion 104 of the pin 16 seats tightly in the first portion 92 of the locking opening 90 and in the inner portion 76 of the first pin passage 70. The tapered end portion 104 of the pin 16 is in abutting engagement with the tapered inner surface 93 of the input shaft 12. The area of engagement between the pin 16 and the shaft 12 extends completely around the circumference of the pin 16, and extends for substantially the entire portion of the pin which is disposed inside the shaft 12. The engagement of the pin 16 in the shaft 12 locks the mounting member 14 to the shaft. The mounting member 14 can not move axially or rotationally relative to the shaft 12.

Figure 5:
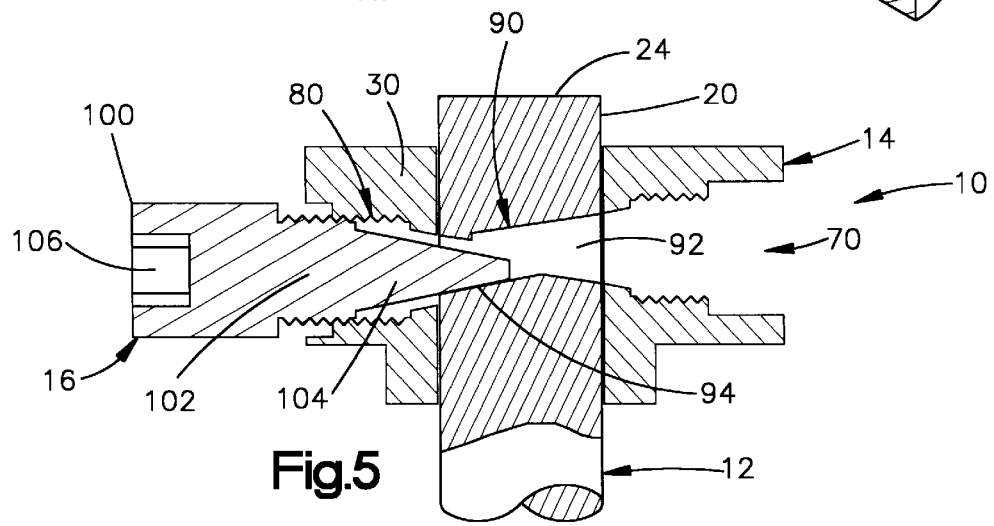
FIG. 5 is a view similar to FIG. 2 showing a first step in disassembly of the apparatus of FIG. 1.
Figure 6:
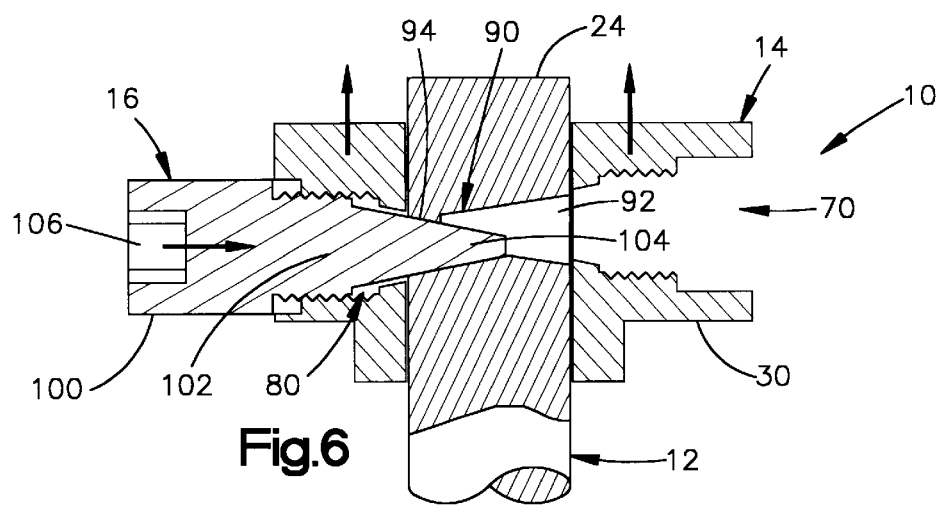
FIG. 6 is a view similar to FIG. 5 showing a second step in disassembly of the apparatus of FIG. 1.

When the mounting member 14 is to be removed from the shaft 12, the locking pin 16 is unscrewed from the hub 30. The press fit of the hub 30 on the shaft 12 continues to resist removal of the mounting member 14 from the shaft. To overcome this resistance, the pin 16 is screwed into the second pin passage 80 in the hub 30 in a manner illustrated in FIGS. 5 and 6. The tapered end portion 104 of the pin 16 engages the tapered inner surface 95 defining the second portion 94 of the locking opening 90 in the shaft 12. This engagement applies an axially directed force between the shaft 12 and the hub 30, tending to urge the hub, and the mounting member 14 as a whole, to move in an upward direction as viewed in FIG. 3 relative to the shaft. As the pin 16 is screwed farther into the second pin passage 80, the mounting member 14 eventually moves axially along the shaft 12 to a position in which it can be removed from the shaft.

From the above description of the invention, those skilled in the art will perceive improvements, changes and modifications in the invention. Such improvements, changes and modifications within the skill of the art are intended to be covered by the appended claims.

Having described the invention, we claim:

1. An apparatus comprising:

a rotatable steering shaft having a surface defining a tapered locking opening;

a mounting member receivable on said shaft, said mounting member having a first locking pin passage; and a locking pin for securing said mounting member to said shaft, said locking pin having a first portion receivable in said first locking pin passage in said mounting member and having a tapered end portion receivable in said tapered locking opening in said shaft to secure said mounting member to said shaft for rotation with said shaft, said mounting member having a second locking pin passage offset axially from said first locking pin passage for receiving said locking pin for removing said mounting member from said shaft.

2. An apparatus as set forth in claim 1 wherein said first portion of locking pin includes a threaded portion receivable in a threaded portion of said locking pin passage.

3. An apparatus as set forth in claim 1 wherein said tapered end portion of said locking pin is tapered at the same angle as said tapered locking opening in said shaft.

4. An apparatus as set forth in claim 1 wherein said locking pin has a head portion for driving said locking pin, a threaded portion for engagement with said mounting member, and said tapered end portion for engagement with said shaft.

5. An apparatus as set forth in claim 1 further comprising a vehicle occupant safety apparatus connected with said mounting member and supported on said shaft by said mounting member for rotation with said shaft.

6. An apparatus comprising:

a rotatable steering shaft having a surface defining a tapered locking opening;

a mounting member receivable on said shaft, said mounting member having a first locking pin passage; and a locking pin for securing said mounting member to said shaft, said locking pin having a first portion receivable in said first locking pin passage in said mounting member and having a tapered end portion receivable in said tapered locking opening in said shaft to secure said mounting member to said shaft for rotation with said shaft, said locking opening having a first portion which extends more than halfway across said shaft for receiving said locking pin to secure said mounting member to said shaft, said locking opening having a second portion opposite said first portion for receiving said locking pin to remove said mounting-member from said shaft.

7. An apparatus comprising:

a rotatable steering shaft having a surface defining a tapered locking opening;

a mounting member receivable on said shaft, said mounting member having a first locking pin passage; and a locking pin for securing said mounting member to said shaft, said locking pin having a first portion receivable in said first locking pin passage in said mounting member and having a tapered end portion receivable in said tapered locking opening in said shaft to secure said mounting member to said shaft for rotation with said shaft, said first locking pin passage in said mounting member having a tapered portion which is tapered at the same angle as said tapered end portion of said locking pin, said tapered portion of said first locking pin passage being aligned with said tapered locking opening when said tapered end portion of said locking pin is received in said tapered locking opening in said shaft, said tapered end portion of said locking pin seating in said tapered portion of said first locking pin passage and in said tapered locking opening to secure said mounting member to said shaft for rotation with said shaft.

8. An apparatus comprising:

a rotatable steering shaft having an outer peripheral surface and having a locking opening extending generally diametrically through said shaft;

said shaft having a tapered inner surface defining a tapered first portion of said locking opening extending radially inward from said outer peripheral surface of said shaft for a distance less than the diameter of said shaft;

a mounting member having an inner peripheral surface receivable on said outer peripheral surface of said shaft, said mounting member having a first locking pin passage; and a locking pin for securing said mounting member to said shaft, said locking pin having a tapered end portion;

said tapered end portion of said locking pin being movable through said first locking pin passage in said mounting member and into abutting engagement with said tapered inner surface in said shaft within said tapered first portion of said locking opening thereby to secure said mounting member to said shaft for rotation with said shaft, said first locking pin passage in said mounting member having a tapered portion which is tapered at the same angle as said tapered end portion of said locking pin, said tapered portion of said first locking pin passage being aligned with said tapered locking opening when said tapered end portion of said locking pin is received in said tapered locking opening in said shaft, said tapered end portion of said locking pin seating in said tapered portion of said first locking pin passage and in said tapered locking opening to secure said mounting member to said shaft for rotation with said shaft.

9. An apparatus as set forth in claim 8 further comprising a vehicle occupant safety apparatus connected with said mounting member and supported on said shaft by said mounting member for rotation with said shaft.

10. An apparatus comprising:

a rotatable steering shaft having an outer peripheral surface and having a locking opening extending generally diametrically through said shaft;

said shaft having a tapered inner surface defining a tapered first portion of said locking opening extending radially inward from said outer peripheral surface of said shaft for a distance less than the diameter of said shaft;

a mounting member having an inner peripheral surface receivable on said outer peripheral surface of said shaft, said mounting member having a first locking pin passage; and a locking pin for securing said mounting member to said shaft, said locking pin having a tapered end portion;

said tapered end portion of said locking pin being movable through said first locking pin passage in said mounting member and into abutting engagement with said tapered inner surface in said shaft within said tapered first portion of said locking opening thereby to secure said mounting member to said shaft for rotation with said shaft, said mounting member having a second locking pin passage offset axially from said first locking pin passage for receiving said locking pin for removing said mounting member from said shaft.

* * * * *